United States Patent [19]
Green, Jr.

[11] Patent Number: 5,483,372
[45] Date of Patent: Jan. 9, 1996

[54] SINGLE AND MULTICHANNEL TRANSMISSION OVER LONG DISTANCES USING REPEATED LEVEL-CROSSING REMODULATION

[75] Inventor: Paul E. Green, Jr., Mount Kisco, N.Y.

[73] Assignee: International Business Machines Corporation, Armonk, N.Y.

[21] Appl. No.: 346,435

[22] Filed: Nov. 29, 1994

[51] Int. Cl.⁶ .................................................. H04B 10/12
[52] U.S. Cl. .................... 359/173; 359/124; 359/176; 359/179; 375/211; 370/13.1; 455/14
[58] Field of Search ................................... 359/115, 124, 359/135, 161, 173, 174, 176, 179; 375/211, 214–215; 370/13.1; 455/7, 14

[56] References Cited

U.S. PATENT DOCUMENTS 5,392,313  2/1995  Noro ........................................ 375/214

FOREIGN PATENT DOCUMENTS 0105453  8/1980  Japan ...................................... 359/179
2268349  1/1994  United Kingdom ................... 359/179

OTHER PUBLICATIONS

E. D. Sunde, "Self–Timing Regenerative Repeaters," *The Bell System Technical Journal*, Jul. 1957, pp. 891–929.
A. F. Elrefaie, "Multiwavelength Survivable Ring Network Architectures," *IEEE*, 1993, pp. 1245–1251.
Patrick R. Trischitta and Eve L. Varma, *Jitter in Digital Transmission Systems*, 1989, pp. 1–47.

*Primary Examiner*—Leo H. Boudreau
*Assistant Examiner*—Kinfe-Michael Negash
*Attorney, Agent, or Firm*—Scully, Scott, Murphy & Presser

[57]  ABSTRACT

A long transmission link for two-level information which is interrupted at spaced intervals in order that the signal's level-crossing information may be extracted and passed on. This level-crossing remodulation process discards amplitude information and retains and retransmits only the times of level crossing. By making the receiver of each remodulator sufficiently wide-banded, the overall link is protocol and bit rate independent in the sense that it can pass any of a wide variety of binary digital signals without requiring reclocking at each stage as is done with conventional regenerators. The preferred embodiment includes an application to multi-wavelength long optical transmission links, and this multi-channel approach avoids many problems associated with optical amplifiers.

10 Claims, 3 Drawing Sheets

SINGLE AND MULTICHANNEL TRANSMISSION OVER LONG DISTANCES USING REPEATED LEVEL-CROSSING REMODULATION

BACKGROUND OF THE INVENTION

1. Field of the Invention

This invention relates to a way of sending two-level information, such as binary digital data over long distances in such a way that the overall system will support almost any signal format, so long as the bandwidth of the system is not exceeded and as long as the format is of the two-level class. The effectiveness of the present invention is based on the novel use of a wide acceptance band at the receiving portion of each level-crossing remodulation function that is spaced at intervals along the transmission path, combined with the fact that at the final receiver, fairly large amounts of timing jitter can accumulate without seriously affecting the error rate, because the accumulated jitter in level crossing instant is only weakly converted into amplitude fluctuations at the point in the final receiver at which a decision is made between levels.

2. Discussion of the Prior Art

Repeaters and regenerators have been used for decades to allow transmission of electrical signals over links of great distances. Such units are interposed at spaced points on the link in such a way as to restore the attenuated and thus noisy signal back to full strength at each repeater or regenerator. Repeaters recreate the entire waveform, amplitude and phase alike, while regenerators, which are used with digital transmissions, make bit-by-bit decisions that are rendered more accurate by recovering bit timing by a process of smoothing over many bit times (often thousands), typically using a phase-locked loop with a long integration time. Repeaters are simply amplifiers, and since each must recreate the full waveform, are very vulnerable to noise. Regenerators are designed to operate at a single bit rate, and therefore the receiver, which includes the phase-locked loop, must have an acceptance bandwidth wide enough to pass the bit rate. Because of this narrow acceptance band, regenerators are much more effective against noise than repeaters and are therefore widely used for digital transmission. However, they require clocking at a known bit rate at each regenerator. The ability to build longer links with digital regenerators than is possible with analog repeaters is one of the reasons that digital transmission has almost completely replaced analog transmission in the world's telephone systems. Both repeaters and regenerators are well described in the article by E. O. Sunde, "Self-Timing Regenerative Repeaters," in the *Bell System Technical Journal*, vol. 36, July, 1957, and in Chapters 1 and 2 of the book by P. Trischitta, *Jitter in Digital Transmission Systems*, Artech House, 1989.

In modern information systems, such as computer networks the problem of transmitting a variety of signal formats over long distances arises very commonly, and flexibility of use often demands a capability to send one format for some time period and then another with a different format over the same path. A different format usually means a different bit rate. Repeaters will provide the bit rate insensitivity desired, but are not a good solution for long distances, since the noise accumulates too rapidly along the sequence of repeaters. Regenerators are not a satisfactory solution either, if bit-rate independence is a requirement, because they involve a commitment to one chosen bit rate; moreover, they do not function with FM, where the level crossings, instead of being at regular intervals as with data, vary widely in their spacing in time.

Thus, repeaters have the desired format independence but poor noise performance, whereas with regenerators the converse is true. What is needed is a way of building long transmission links by inserting at appropriate points on the overall link some kind of device such that by the time the signal is observed at the final receiver, the noise will not have built up as rapidly as it would with a series of repeaters, and yet the devices must possess the bit rate independence that is not available with regenerators.

The present invention satisfies this requirement. It is based on simply passing on the level-crossing times at each stage, and adding a wide bandwidth capability to each receiver filter preceding the level-crossing determination at each stage, and also capitalizing on the surprisingly small conversion of timing jitter into amplitude noise at the final receiver when clock recovery by long smoothing times is used, as with a phase-locked loop. The process is called here "level-crossing remodulation". The fact that the conversion of phase jitter into amplitude fluctuations is weak has been well documented in the literature, for example, in FIGS. 4.5 and 4.6 of the book by P. Trischitta, without an analysis having been made up to now of how this weak dependence can be exploited in a series of remodulators that only retain level crossing time information. The idea of passing on only the level crossing timing information while throwing away all amplitude information is mentioned in passing and rejected as unworkable in Section 1.1 of the paper by E. O. Sunde, "Self-Timing Regenerative Repeaters," in the *Bell System Technical Journal*, vol. 36, July, 1957, but only in the context of a single predetermined bit rate. In addition, Sunde does not mention the use of a wideband filter and does not address the general problem of designing a long link that will handle arbitrary bit rates. The idea of building long links by repeated recreation of the level crossing instants, where at each such remodulation the receiver bandwidth is maintained wide enough to allow bit rate independence and of exploiting the weak conversion of timing jitter into amplitude noise at the final receiver are not known in the literature.

SUMMARY OF THE INVENTION

It is an object of the present invention to provide the ability to transmit two-level signals of essentially any bit rate up to some maximum over long distances in spite of link attenuation which would otherwise limit the distance. Accordingly, this invention provides at spaced points along the link a level-crossing remodulation means consisting of a detector, followed by a wideband filter, followed by a level-crossing threshold element in the form of a slicing circuit, followed by electrical amplification followed by transmission of the strong two-level signal toward the destination. The final receiver at the destination consists of a detector, followed by a wideband filter, followed by a sampling device that samples at the optimum point in each bit time whether the bit was a zero or a one. The sampling device is driven by a standard clock recovery circuit, typically based on a phase-locked loop. Thus, only the transmitter at the beginning and the receiver at the end need to agree on the bit rate used between them; this information is not needed along the path, and the entire link can be used for any bit rate not exceeding the maximum allowed by the wideband filters in the remodulators. The preferred embodiment shows this technique being used in an optical wavelength division link where, at each stage the level-crossing remodulation is applied separately to the various channels, which differ in the optical wavelength at which each carries its bit stream.

BRIEF DESCRIPTION OF THE DRAWINGS

The accompanying drawings, together with the written descriptions, illustrate the general principles of both single-channel and multi-channel embodiments.

DETAILED DESCRIPTION OF THE INVENTION

Figure 1:
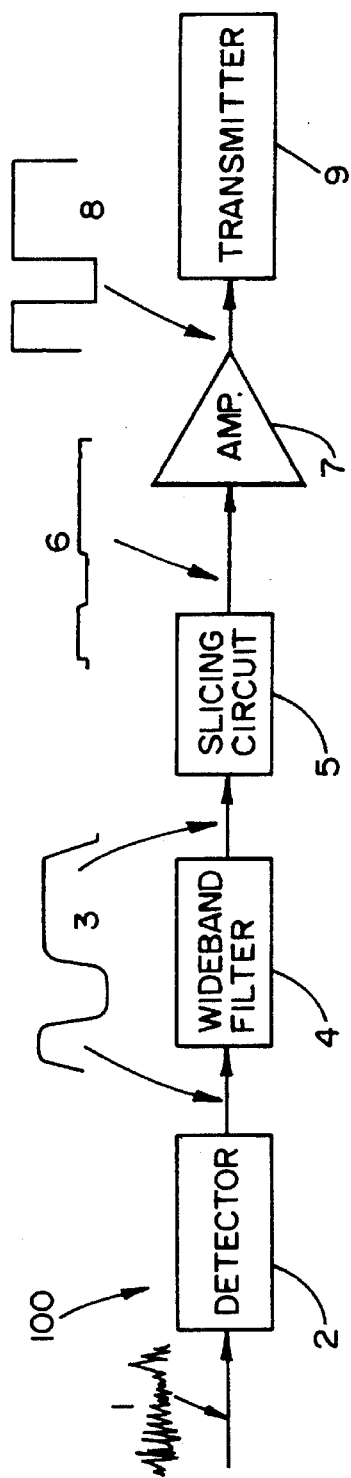
FIG. 1 is a block diagram of a typical level-crossing remodulator of the present invention.

FIG. 1 shows a single level-crossing remodulator 100 of the present invention. A weak and noisy two-level signal 1 arrives at detector 2 which produces at its output a noisy version 3 of the intended two-level transmitted information stream. Waveform 3 is passed through a wideband filter 4 whose upper frequency cutoff is high enough to pass the modulation sidebands of the highest bit rate expected to be used on the system, while allowing signals of all lower bit rates to pass through. The output of wideband filter 4 is passed to slicing circuit 5, which forwards only the observed level transitions. Because arriving signal 1 is noisy, slicing circuit 5 will make only an imperfect determination of the intended transition time, that is, it will introduce timing jitter. The output waveform 6 of the slicing circuit 5 is passed to an amplifier 7, and the amplified signal 8 is applied to a transmitter 9. Slicing circuits are well known in the art.

Figure 2:
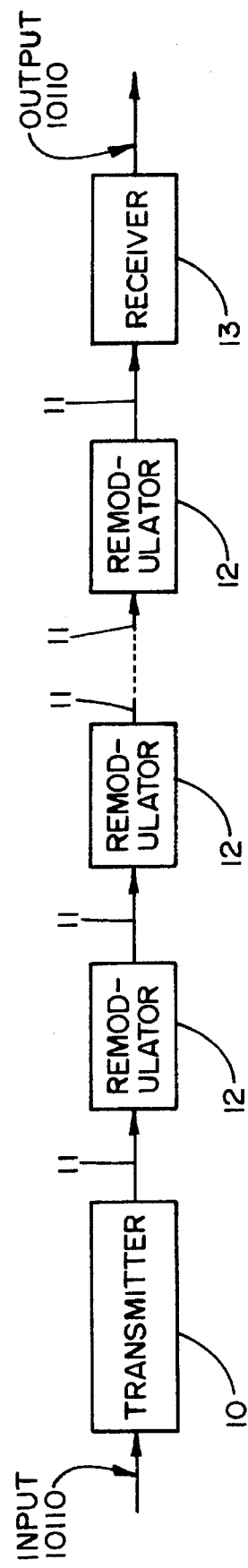
FIG. 2 is a block diagram of a long link consisting of a transmitter, several link segments with a remodulator of the present invention at the end of each, except for the last segment at whose end is placed the final receiver.

FIG. 2 shows an overall link using the level-crossing remodulation process repeatedly. The link consists of a transmitter 10, link segments 11, remodulators 12, and final receiver 13. Each of the remodulators 12, which were shown in detail in FIG. 1, adds its own contribution to the accumulated timing jitter along the chain. However, by throwing away the amplitude information at each remodulator 12, the only amplitude fluctuations that will appear at the final receiver are those accumulated on the last link segment plus any additional amplitude fluctuations that might be caused by the accumulated timing jitter.

Figure 3:
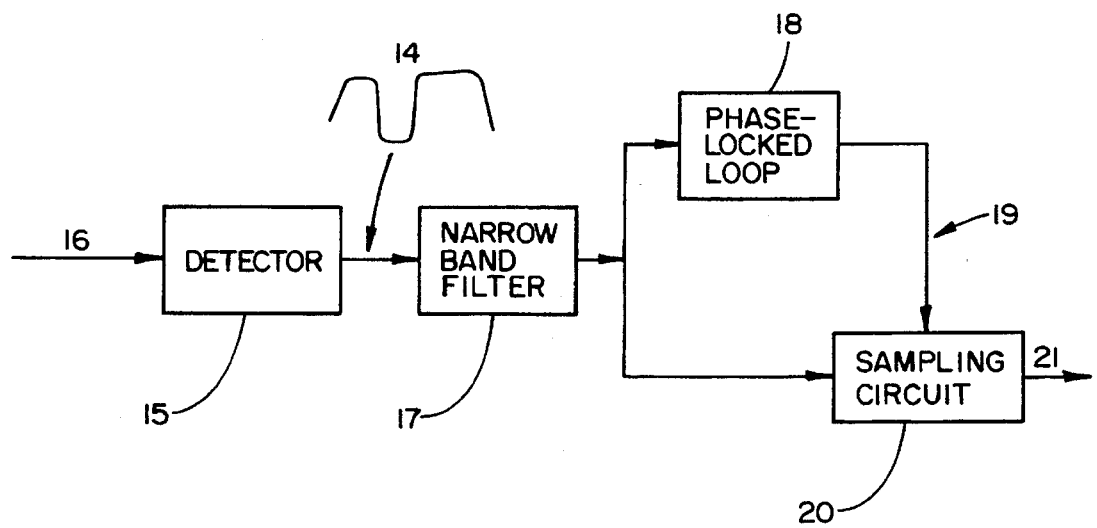
FIG. 3 is a block diagram of the final receiver of the remodulation system of the present invention.

The final receiver 13, well known in the art, operates as shown in FIG. 3. The predetermined bit rate has been agreed upon only by the transmitter 10 and the final receiver 13. In this case, after the noisy two-level signal 14 has been generated by a detector 15 from the arriving weak and noisy two-level signal 16, signal 14 is passed through a narrowband filter 17, whose center frequency is at the predetermined bit rate and which is wide enough in frequency only to pass most of the modulation sidebands, and then fed to a conventional narrowband phase-locked loop 18 which is operated at the predetermined bit rate, and which smooths the arriving jittered signal over many bit times, typically thousands, in order to establish the correct sampling instant, which is provided as input 19 to the sampling circuit 20. Because the smoothing time of the phase-locked loop 18 can be made so long, it can be designed to make a very clean determination of the right bit clock phase, in spite of the accumulated phase jitter at the final receiver. At the periodic sampling instants, the output of narrowband filter 17 is observed by the sampling circuit 20 to determine likely presence of a zero or one. The sequence so determined constitutes the output bit stream 21.

Figure 4:
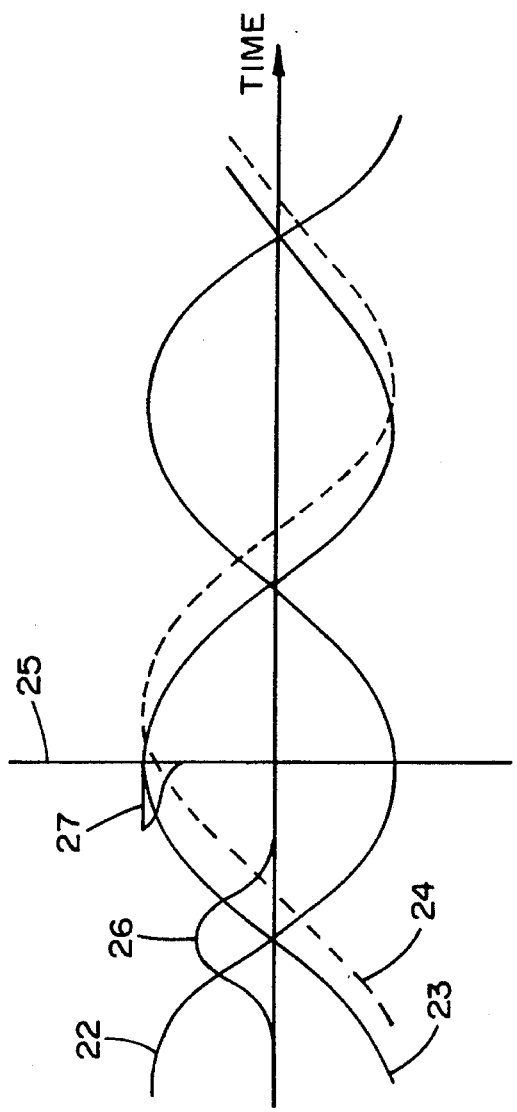
FIG. 4 is a typical eye diagram at the narrowband filter output of the final receiver of FIG. 3 and illustrates how a large amount of phase jitter is converted into a small amount of amplitude fluctuation.

In addition to the use of wideband filters 4 at the input of each remodulation stage 12, the effectiveness of the present invention depends on the way the accumulated phase jitter maps over into mistiming of the sampling instant, which is equivalent to an additional amplitude jitter at the final receiver. FIG. 4 shows why this effect is so small. The graph of FIG. 4 shows an idealized eye diagram, well known in the art, with phase jitter only; amplitude fluctuations are not shown. Curves 22 and 23 show the averaged waveform observed at the input of sampling circuit 20. The sinusoidal shape is due to the extremely narrow width of narrowband filter 17. Dashed line 24 shows a level transition arriving with misplaced timing. It is seen that this rather large amount of timing error maps over into a small amplitude error at the sampling instant 25. In fact, the two-sided probability distribution 26 of timing jitter is seen to map over into the much narrower one-sided probability distribution 27 of amplitude fluctuation. It is this small amplitude fluctuation induced by the phase jitter that is never observed on any link segment except the last one, at which point it adds to the amplitude noise that is caused by the limited noise immunity of the last link segment only.

Figure 5:
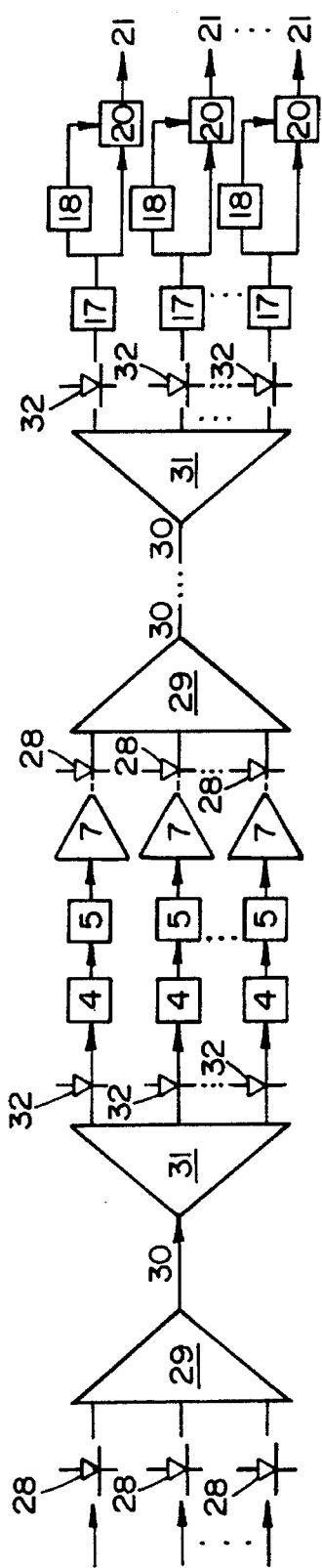
FIG. 5 is part block diagram and part schematic diagram of the level-crossing remodulator system of the present invention used in a long multi-wavelength optical link to provide bit rate-insensitive transmission of many channels over long distances.

FIG. 5 shows the use of level-crossing remodulation to produce a bit rate independent long multi-wavelength optical link. Each transmitter 10 of FIG. 2 takes the form of a laser diode 28, each of these operating at a different wavelength from one another. A conventional wavelength division multiplexor 29, typically a diffraction grating, combines the outputs of laser diodes 28 onto the transmission fiber 30, which plays the role of the link segments 11 of FIG. 2. At intervals along the overall link, there is a wavelength division demultiplexor 31, a set of photodetectors 32, each playing the role of detector 2 of FIG. 1, wideband filters 4, slicing circuits 5, amplifiers 7, and another set of laser diodes 28, each at its different wavelength and each playing the role of transmitter 9 of FIG. 1. The laser diode outputs are remultiplexed onto the next link segment by means of another wavelength division multiplexor 29. This process is repeated at the end of each link segment until the final receiver is reached where a demultiplexor 31 feeds the usual set of photodetectors 32, each of which now plays the role of detector 15 of FIG. 3, followed by narrowband filters 17, phase-locked loops 18 and sampling circuits 20 that were shown earlier in FIG. 3.

From the system point of view, the fact that signals are converted to electronic form at the end of each segment allows one to isolate a given channel at a given segment end, tap off that bitstream and reinsert a new one. This is the "add-drop" capability, important in many applications, and unavailable with optical amplifier chains. It is also possible to change at a segment end the assignment of which bitstream will be forwarded on which wavelength channel, either on a fixed, hard-wired basis, or on a dynamic basis by inserting a crossbar switch after the set of amplifiers 7 and before the laser diodes 28.

The multi-channel realization of this invention solves many problems faced in building long wavelength-division optical links using chains of optical amplifiers. Erbium doped fiber amplifiers do not have enough bandwidth to access the entire low-attenuation bandwidth of optical fiber, whereas the level-crossing remodulation technique does not restrict the laser diodes 28 and 32 to operate at wavelengths close to each other. If one substitutes laser diode amplifiers for erbium doped fiber optical amplifiers, problems of crosstalk and polarization dependence result. All these amplifier problems are described in Chapter 6 and Sections 8.11 and 8.14 of the book *Fiber Optic Networks*, by P. E. Green, Jr., Prentice Hall, 1992, in which it is also pointed out that erbium amplifiers also suffer from irregularities of gain as a function of wavelength. The multi-channel level-crossing remodulation invention does not have this disadvantage; in fact, wavelength-by-wavelength gain variations between the various amplifiers 7 within one multi-channel remodulator can be deliberately introduced to compensate, for example, for the wavelength dependence of the attenuation of the fiber constituting the link segment. Also, the level-crossing remodulation technique avoids the buildup of so-called amplified spontaneous emission introduced by each optical amplifier and also described in Chapter 6 of the book by Green, and the buildup of nonlinearity effects described in Section 3.14 of the same book.

The present invention avoids numerous additional problems that occur with prior art transmission systems. The following is a list of some but not all of the problems avoided:

1. Avoids the need for bit clock recovery at the end of any segment prior to the last one on a long single channel link and for each channel of a long multi-channel link.
2. Avoids the use of chains of linear amplifiers while still preserving bit rate independence of the link.
3. Avoids the bandwidth limitations of chains of wideband amplifiers in a multi-wavelength or multi-frequency multi-channel link.
4. Avoids the crosstalk disadvantages of chains of wideband laser diode amplifiers in a multi-wavelength optical link.
5. Avoids the polarization dependence disadvantages of chains of laser diode amplifiers in an optical link.
6. Avoids irregularities of gain with wavelength or frequency in chains of wideband amplifiers in a multi-wavelength or multi-frequency multi-channel link, where the gains of the various amplifiers corresponding to the various wavelengths or frequencies are adjusted to have appropriately different values so as to compensate for the irregularities.
7. Compensates for differences of link segment attenuation as a function of wavelength or frequency in long links, where the gains of the various amplifiers corresponding to the various wavelengths or frequencies are adjusted to have appropriately different values so as to compensate for the irregularities.
8. Avoids the buildup of amplified spontaneous emission noise and its intermodulation products in chains of wideband optical amplifiers in a multi-wavelength multi-channel optical link.
9. Avoids the buildup of the effects of nonlinearities in the fiber or other medium in chains of wideband amplifiers in a multi-wavelength or multi-frequency multi-channel optical link.
10. Avoids the buildup of the effects of dispersion in the fiber or other medium in chains of wideband amplifiers in a multi-wavelength or multi-frequency multi-channel optical link.

While the invention has been particularly shown and described with respect to preferred embodiments thereof, it will be understood by those skilled in the art that the foregoing and other changes in form and details may be made therein without departing from the spirit and scope of the invention.

Having thus described the invention, what is claimed as new and desired to be secured by Letters Patent is:

1. A system for transmitting two-level information over long distances comprising:

a transmission line for transmitting a two-level signal, said line being divided into a plurality of segments;

a plurality of remodulators disposed in said line defining said segments, each of said plurality of remodulators including a slicing circuit for detecting each level transition time of said two-level transmission signal and outputting a signal representative of the level transitions, an amplifier for amplifying the level transition signal and a transmitter for transmitting the amplified level transition signal on one of said segments of said transmission line; and a receiver at the end of a last one of said plurality of segments of said transmission line, said receiver including a narrowband filter having a center frequency at a predetermined bit rate, a narrowband phase-locked loop coupled to said narrowband filter for determining the sampling instant and a sampling circuit coupled to said phase-locked loop for outputting the transmitted signal.

2. The system of claim 1 wherein each of said remodulators includes a wideband filter for inputting low-level signals to said slicing circuit, said wideband filter passing said low-level signal up to a maximum preselected bit rate.

3. The system of claim 1 wherein said transmission line is an optical line and each of said remodulators includes means for converting optical signals to electrical signals at an input and means for converting electrical signals to optical signals at an output of said remodulator.

4. A system for transmitting multi-channel two-level information over long distances comprising:

a transmission line for transmitting a multi-channel two-level signal, said line being divided into a plurality of segments; and a plurality of remodulation stations disposed in said line defining said segments, each of said remodulation stations including a demultiplexor for separating the multi-channel two-level signal received at each station into a multiplicity of channels, each of said channels having a remodulator comprising;

a slicing circuit for detecting each level transition time on each channel and outputting a signal representative of the level transition, and an amplifier disposed in signal receiving relationship with said slicing circuit, for receiving and amplifying the level transition signal output, each of said remodulation stations including a multiplexor for combining the amplified level transition signals from the remodulators and transmitting said multiplexed signal on one of said segments of said transmission line.

5. The system of claim 4 wherein each of said remodulators includes a wideband filter for inputting low-level signals to said slicing circuit, said wideband filter passing said low-level signal up to a maximum preselected bit rate.

6. The system of claim 4 further including a receiver at the end of the last segment of said transmission line, said receiver including a narrowband filter having a center frequency at a predetermined bit rate, a narrowband phase-locked loop coupled to said narrowband filter for determining the sampling instant and a sampling circuit coupled to said phase-locked loop for outputting the transmitted signal.

7. The system of claim 4 wherein the amplifier in each channel at each remodulation station has the gain set at a sufficiently different value to compensate for irregularities of gain in the channels.

8. The system of claim 4 further including means for breaking out signals from one or more channels of a remodulator and reinserting on said one or more channels a new two-level signal derived from a source local to that remodulator.

9. The system of claim 4 further including means for breaking out signals from one or more channels of a remodulator and reconnecting said signals for transmission to the outputs of a different remodulator.

10. The system of claim 4 wherein said transmission line is an optical line and each of said remodulators includes means for converting optical signals to electrical signals at an input and means for converting electrical signals to optical signals at an output of said remodulator.

* * * * *

UNITED STATES PATENT AND TRADEMARK OFFICE
CERTIFICATE OF CORRECTION

PATENT NO. : 5,483,372
DATED : January 9, 1996
INVENTOR(S) : Paul E. Green, Jr.

It is certified that error appears in the above-indentified patent and that said Letters Patent is hereby corrected as shown below:

Column 1, line 6,
Before "Technical Field" insert the following:

> The invention herein was made with Government support under Contract MDA972-95-C-0001 awarded by the Advanced Research Projects Agency (ARPA). The Government has certain rights in this invention.

Signed and Sealed this

Seventeenth Day of December, 1996

Attest:

BRUCE LEHMAN

*Attesting Officer*  *Commissioner of Patents and Trademarks*